Figure 1:
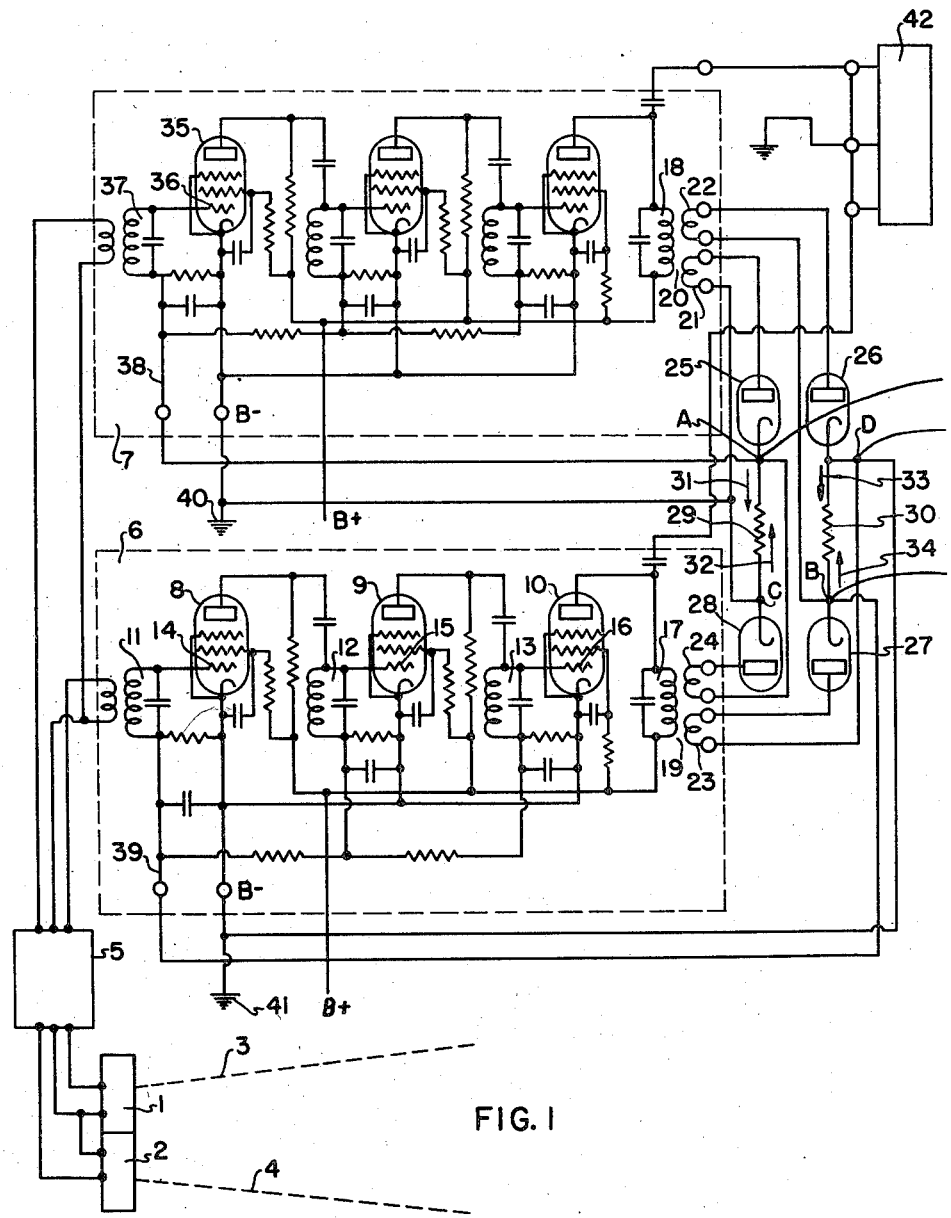

March 30, 1948.  C. H. WATERMAN  2,438,526
SYSTEM FOR DETERMINING THE DIRECTION OF SOURCES OF SOUND
Filed April 18, 1944  3 Sheets-Sheet 1

INVENTOR.
CHARLES H. WATERMAN
BY

March 30, 1948.  C. H. WATERMAN  2,438,526
SYSTEM FOR DETERMINING THE DIRECTION OF SOURCES OF SOUND
Filed April 18, 1944  3 Sheets-Sheet 3

*INVENTOR.*
CHARLES H. WATERMAN
BY

Patented Mar. 30, 1948

2,438,526

UNITED STATES PATENT OFFICE 2,438,526

SYSTEM FOR DETERMINING THE DIRECTION OF A SOURCE OF SOUND

Charles Hamlin Waterman, South Portland, Maine, assignor, by mesne assignments, to Submarine Signal Company, Boston, Mass., a corporation of Delaware Application April 18, 1944, Serial No. 531,681

9 Claims. (Cl. 177—352)

The present invention relates to methods and means for determining the direction of a source of wave energy which may be a primary source or a secondary source. By secondary source is meant a body which reflects or refracts energy which the body itself receives from an original or primary source.

The invention is more particularly applicable to sound ranging by the use of supersonic frequencies in which the receiving pickup stations pick up a wave from a primary or secondary source. The method employed for determining the range of the object being observed must be different where the object itself creates an unknown source of compressional wave from that where the object simply reflects waves transmitted from the observing station. With methods in which the observing station sends out a directed or non-directed wave pulse and receives directively or non-directively the reflected wave, the time interval between the emission of the pulse and the receipt of the reflected echo is commonly used to measure the distance and by having the transmitted pulse in a beam or the received pulse directively received, the direction of the reflecting source may be observed. In such measurements it is highly desirable to determine the direction of the reflecting source with extreme accuracy; while when a primary source is being observed, the determination of the direction with great accuracy is even more important since range must be determined in this case by two successive or simultaneous observations on a base whose length may be small compared to the magnitude of the distance of the object being observed.

The present invention is more particularly concerned, therefore, with the accuracy of determination of the direction of a reflected or primary source, and the receiving units and circuits provide means for amplifying such bearing deviation so that the direction of the source may be observed with an accuracy at least as great as that permitted by the natural errors and variations which occur in the transmission of sound waves through a medium.

In the present invention two directive receiving units are employed having their maximum sensitivity on axes which define a small angle with one another which may be one or two degrees or somewhat greater. In fact, a single unit may be employed in which parts provide the two maximum axes defining the angle as described. Each of these units or separate parts of the same unit each independently receive, amplify and rectify the signal, the rectified pulse from the signal being in part at least applied as a sensitivity control to the other receiving and amplifying circuit with the result that the signal which is the stronger reduces the sensitivity control of the other receiver to bring about a predominance of one signal only unless a balance is obtained.

There may also be employed in this system between the pickup units and the receiving and amplifying circuits, an artificial line for retarding or advancing the phase of one signal over the other, thereby initially creating a magnitude change of the signal as impressed upon the receiving circuit.

The system may be used with most any type of indicator desired, as, for instance, a voltmeter having a center balance with a swing of the needle right or left, a D. C. vacuum tube indicator which may operate a visual right and left signal as, for instance, a pair of neon tubes, or a cathode ray tube indicator may also be employed.

Figure 2:
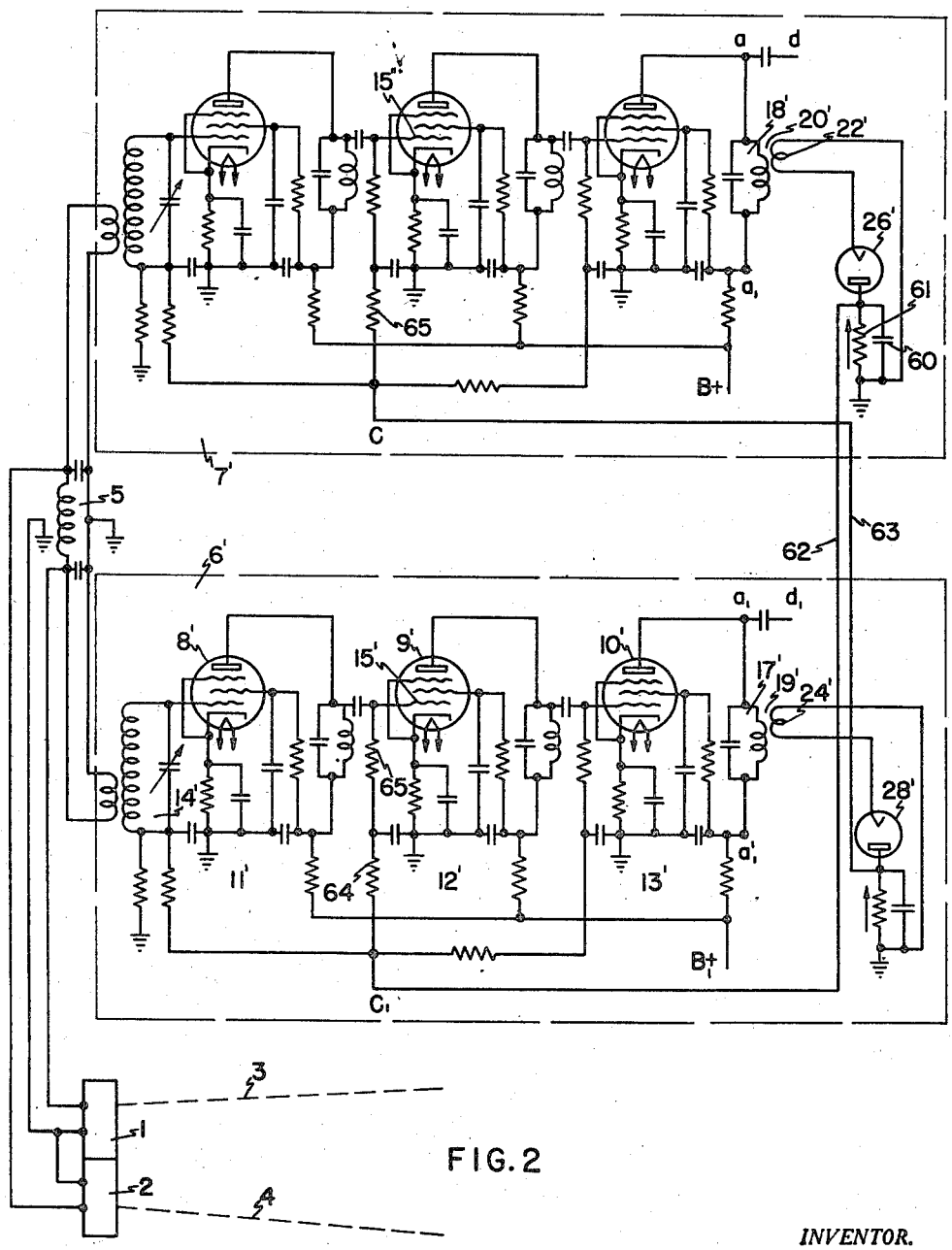
Figure 3:
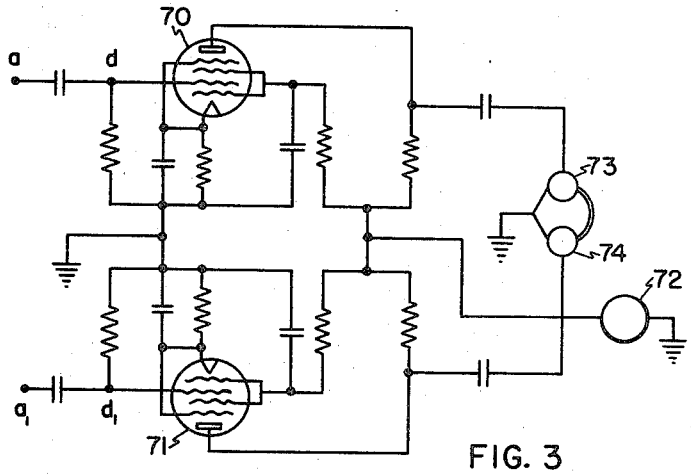
Figure 4:
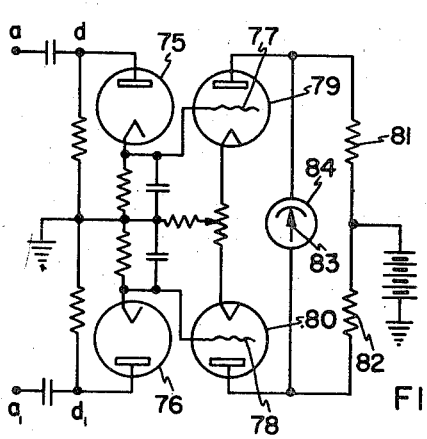
Figure 5:
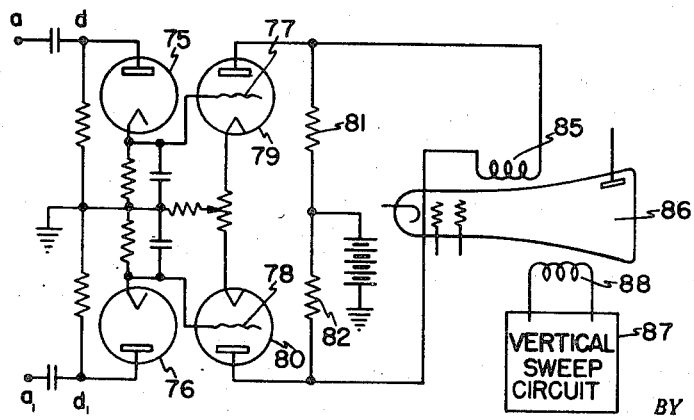

The merits and advantages of the present invention will be more readily understood in connection with the description in the specification below when read in connection with the drawing in which Fig. 1 shows a circuit diagram of the invention, Fig. 2 shows a modification thereof. Fig. 3 is a circuit diagram for an indicating circuit operable in connection with the diagram of Fig. 2 for providing audible indication. Fig. 4 is an indicating circuit operable in connection with the diagram of Fig. 2 to provide an indication by means of a center balance meter, and Fig. 5 is a circuit diagram for an indicating circuit operable in connection with the diagram of Fig. 2 for providing a visual indication by means of a cathode ray tube.

In the drawing the pickup units are indicated at 1 and 2. Each of these is preferably directive with the directive axes 3 and 4 of reception diverging from each other at a small angle of from one to two or more degrees. The signal received on the units 1 and 2 is transmitted through the artificial line 5 which may be lagging or leading to the independent receiver amplifiers 6 and 7, respectively, which are preferably similar in all respects. These amplifiers are shown as straight tuned plate amplifiers of three stages but any other type of amplifier may be used such, for instance, as a superheterodyne circuit or other usual amplifying system. In the amplifier 6, for instance, the amplifier tubes 8, 9 and 10 may be of the 6SK7 type and the circuits 11, 12 and 13, respectively, connected to the control grids 14, 15 and 16, respectively, may be tuned to the signal being received and observed. The circuits 12 and 13 couple the stages of the amplifier. Each amplifier 6 and 7 has a tuned output circuit 17 and 18 in which the transformers 19 and 20, respectively, are provided each with two secondaries 21 and 22 for the transformer 20 and 23 and 24 for the transformer 19. Each secondary 21 and 22 is connected in circuit with a diode rectifier tube 25 and 26, respectively, while the secondaries 23 and 24 are also respectively connected in circuit with the rectifier tubes 27 and 28. The cathode electrodes of the diodes 25 and 28 are joined through a resistor 29 while the cathodes of the diodes 26 and 27 are joined through a resistor 30, the resistor 29 being in the circuits of both tubes 25 and 28 while the resistor 30 is in series with the rectifier circuits of tubes 26 and 27. The result of this arrangement is such that when current flows through the diode 25, the direction of potential drop in the resistor 29 is in the direction of the arrow 31; while when current flows through the diode 28, the direction of the drop in the resistor 29 is in the direction of the arrow 32. Similarly, when the tube 26 is conducting current, the direction of the potential drop in the resistor 30 is in the direction of the arrow 33, while when the tube 27 is conducting current, the direction of the potential drop in the resistor 30 is in the direction of the arrow 34.

The grid 36 of the tube 35, the first tube in the amplifier 7, is connected through the tuned grid circuit 37 and the conductor 38 to the point A which is the cathode connection for the diode 25. In a similar fashion the grid 14 of the tube 8 in the amplifier 6 is connected through the grid circuit 11 and the conductor 39 to the point B which is the cathode terminal of the diode 27. It will also be noted that the other stages in the amplifiers 6 and 7 have the grids of the tubes connected with the diodes 27 and 25 respectively. This gives a greater dynamic range of operation.

The secondaries 21 and 22 of the transformer 18 are both energized by the incoming signal impressed upon the input of the amplifier 7 so that both diodes 25 and 26 normally are conductive at the same time, so that when 25 and 26 become conductive, current flows through the resistors 29 and 30 in the direction of the arrows 31 and 33. As has been mentioned above, the point A is connected to the grid 36 in the amplifier 7 while the point B is connected in the same manner to the grid 14 of the amplifier 6. The point C, the terminal of the cathode of the diode 28, is connected to ground at 40 while the point D, the terminal of the cathode of the diode 26, is also connected to ground at 41 so that both of the points C and D are always at the same potential.

In the amplifiers 6 and 7 it will also be noted that the cathodes are also grounded with their terminals being made in the usual manner the negative side of the B supply.

When current, therefore, flows in the direction of the arrows 31 and 33, a relative positive bias is placed on the grid 36 of the tube 35 in the amplifier 7 and a relatively negative bias is placed upon the grid 14 of the tube 8 in the amplifier 6. Therefore, the signal through the amplifier 7 tends to increase the sensitivity of the amplifier 7 and simultaneously decrease the sensitivity of the amplifier 6. If desired the return from the rectified output of the amplifier 7 to its grid bias terminal may be omitted, and the rectified output only applied to decrease the gain of the other amplifier 6. In the same way the signal passed through the amplifier 6 due to the direction of the current flow as indicated by the arrows 32 and 34 tends to increase the sensitivity of the amplifier 6 and decrease the sensitivity of the amplifier 7 since a positive bias tends to be placed upon the grid 14 by the resistor 30 due to the current flow in the direction of the arrow 34 and a negative bias tends to be placed upon the grid 36 by the resistor 29 due to the current bow in the direction of the arrow 32. When the currents in oposite direction in the resistors 29 and 30 are balanced, the signals from both amplifiers will be balanced and an equally sensitive right and left signal will be obtained.

The element 42 to which the output of the two amplifiers are connected may be any of the usual right and left indicators such as that disclosed in my companion application, Serial No. 518,767, filed January 18, 1944. The element 42 may also be a training control system for controlling the orientation of the receivers 1 and 2 such, for instance, as that disclosed in the application of William G. Gorton, Serial No. 511,159, filed November 20, 1943. If leads are taken from the points A, B and D, these may be applied to a D. C. vacuum tube indicator with the point D serving as a neutral or common terminal. The artificial line 5 which may be of the lag or lead type is preferably the same as that disclosed in my companion application mentioned above.

In the arrangement indicated in Fig. 2, the two amplifying circuits 6' and 7' are similar and are connected with the pickup units 1 and 2 through the artificial line 5 similarly as in Fig. 1. The amplifier circuits 6' and 7' of Fig. 2 may have pentodes 8', 9' and 10' similar to that of the circuit of Fig. 1. In the circuit of the amplifier 6' and 7', however, the plate circuits of the stages 11', 12' and 13' are tuned and these stages are resistance coupled one to the other. The input circuit to each amplifier, as for instance, the circuit 14' may be sharply tuned, while the plate circuits of the different stages may be broadly tuned if desired. The output of the final stage of each amplifier is provided with tuned circuits 17' and 18' which are coupled through the transformers 19' and 20' to secondaries 22' and 24'. These secondaries operate and control diode rectifiers 26' and 28'. The plate circuits of the diodes are connected to ground through parallelly connected condensers 60 and resistors 61. The potential of the plates of each of the diodes is applied respectively to the lines 62 and 63 to the grids 15' and 15'' of the second stage in the amplifiers 6' and 7' respectively. Suitable resistors 64 and 65 may be connected in the grid circuit for this purpose. In this manner the pulse through each amplifier is applied negatively to the other amplifier to reduce its amplification until one pulse will greatly predominate over the other.

In the circuit of Fig. 3 the points $a$, $d$, and $a_1$, and $d_1$ correspond to the same designated points in Fig. 2 and the signal is therefore impressed by the amplifiers 7' and 6' respectively on the grids of the vacuum tubes 70 and 71 in Fig. 3. This circuit provides an audible note by means of the heterodyne oscillator 72, the oscillations of which are applied to mixing grids in the tubes 70 and 71. The result of this is that when the signals of each amplifier are passed through their respective tubes an output signal of an audio frequency will be provided in each of the telephones 73 and 74 respectively, whose intensity may be compared.

In the arrangement indicated in Fig. 4 the points $a$ and $d$ and $a_1$ and $d_1$ correspond to the same points in Fig. 2. The signals from each of the amplifiers are independently rectified in the diodes 75 and 76, the outputs of which act on the grids 77 and 78 respectively in such a manner as to control the current in the vacuum tubes 79 and 80. If the potential drop in the resistors 81 and 82 is equal then the hand 83 on the D. C. meter 84 will stand at a center balance. When, however, the drop across the resistances 81 and 82 becomes unbalanced through greater current flow in one than in the other, current will begin to flow through the meter in a relative right or left direction causing the meter hand to turn correspondingly clockwise or counter-clockwise.

In the arrangement of Fig. 5 the same type of circuit as shown in Fig. 4 is used with the exception that in place of the meter 84, a cathode ray tube indicator is used. In this case the horizontal deflection coil 85 is substituted in the circuit in place of the meter 84, and a cathode ray tube 86 is used which is provided with a luminous face upon which the indication may be viewed. The cathode ray tube as in the usual manner provides a cathode ray beam which may be continually swept in a vertical direction by the sweep circuit 87 operating the sweep coil 88, the coil 85 producing the horizontal deflection component by means of which the axis of the figure made by the beam is rotated from a vertical to an inclined direction.

The methods above described are particularly useful in the present system for determining the direction of a wave energy source particularly where the direction of such a source must be determined with great accuracy for both direction and distance determination as has been previously described above.

Having now described my invention, I claim:

1. A method of intensifying the balance be-between two signal elements which comprises amplifying each signal element separately and impressing at least a portion of the amplified signals of each signal element back on the amplifier of both signal elements separately, the portion of the signal impressed upon its own original signal element being in a direction to increase that signal intensity and on the other signal element being in a direction to reduce that other signal intensity.

2. A method of intensifying the balance between independent signals which comprises separately amplifying each of said signals, impressing a portion of each of said amplified signals after rectification thereof on its own and on the other amplifying system the signal impressed upon its own amplifying system being in such a direction as to increase the signal intensity and on the other amplifying system being in such a direction as to decrease the signal intensity whereby a magnified difference is obtained between the two signals in a position other than in balance.

3. A method of determining the direction of source of wave energy by means of two directive receivers having a maximum intensity reception axis directed at a small angle with one another which comprises receiving and amplifying the signals received on each receiver independently of one another, impressing at least a portion of the signal so received on each receiver after amplification and rectification thereof back on its own amplifying system and on the amplifying system for the other signal, the portion of the signal impressed on its own amplifying system being in a sense to increase its signal intensity and the portion impressed on the other amplifying system being in a sense to reduce the signal intensity whereby a balance will be obtained when the receivers are faced to the wave source with the bisector of the angle between the maximum intensity axes parallel to the direction of propagation of the waves.

4. A system for intensifying the balance between two signals received on a pair of receiving systems having maximum directive reception axes directed with a small angle between such axes comprising separate amplifier means for amplifying each of the signals, means for impressing a portion of the signal amplified by the separate amplifier, means on each of said amplifying means to control the sensitivity thereof, the portion of amplified signal impressed upon the same amplifying means being in a direction to increase the sensitivity of the amplifying means and upon the other amplifying means to decrease the sensitivity thereof.

5. In a system for intensifying the balance between two separate signals, in combination, a pair of separate amplifying means for amplifying each of said signals independently, means for impressing a portion of the output of said separate amplifying means on the input of each of said separate amplifying means, the output of such portion of the amplifying means impressed upon its own amplifier being in a direction to increase the sensitivity of the amplifier and on the other amplifier being in a direction to decrease the sensitivity of the other amplifier.

6. In a system of intensifying the balance between two signals received on separate receiving elements, independent amplifying means, rectifier means connected to receive the output of each of said amplifying means and means for impressing the output of said rectifier means back upon the input of each of said amplifying means, the rectified output of each amplifier being impressed both upon its own amplifier and upon the other amplifier and being in a direction to increase sensitivity of its own amplifier and decrease the sensitivity of the other amplifier.

7. A system for determining the direction of source of sound waves comprising two separate receiving elements each directive to the source of sound waves with a maximum directive axis oriented in direction forming a small angle between each other, independent receiving means for receiving and amplifying each of the signals picked up on the receiving elements, rectifier means connected to the output of each amplifying means, means for impressing a portion of the rectified output of each amplifying means on the same amplifying means and on the other amplifying means, the output portion impressed on the same amplifying means being in a sense to increase the sensitivity of the amplifying means, the output portion impressed on the other amplifying means being in a sense to decrease the sensitivity of the other amplifying means whereby a sensitive balance is obtained when the original signals impressed upon the amplifying means have the same intensities.

8. In a system for determining the balance between signals received on independent receiving elements, independent ampifying means connected to said receiving elements to amplify the signals received on each receiving element, rectifier means connected to the outputs of each amplifier means, said rectifier means comprising a pair of similar amplifying elements one element of said pair having its output impressed upon the input of its own amplifying means, and the other element having its output impressed upon the input of the other amplifying means, the first in a sense to increase the sensitivity of the amplifier and the second in a sense to decrease the sensitivity of the amplifier whereby the balance between the two signals received is greatly amplified.

9. In a system for determining the balance between signals received on independent receiving elements, independent vacuum tube amplifying means for amplifying each signal having initially biased grid electrodes for sensitivity control, and rectifier means connected to the outputs of each of said amplifying means, said rectifier means having a pair of rectifier elements, means connecting one element of a pair of said rectifier elements to provide a biasing potential on the control grid of one amplifying means and the other rectifying element to provide a biasing potential on the control grid of the other amplifying means, the direction of the bias on the amplifying means through which the output passed being in a sense to increase the sensitivity of the amplifier and the sense of the bias on the grid of the other amplifying means to decrease the sensitivity of the amplifying means whereby an increased sensitivity of balance is obtained.

CHARLES HAMLIN WATERMAN.

REFERENCES CITED

The following references are of record in the file of this patent:

UNITED STATES PATENTS

| Number | Name | Date |
|---|---|---|
| 2,262,457 | Hammond | Nov. 11, 1941 |
| 2,169,742 | Scharlau | Aug. 15, 1939 |
| 2,226,366 | Braden | Dec. 24, 1940 |

FOREIGN PATENTS

| Number | Country | Date |
|---|---|---|
| 117,525 | Australia | Sept. 30, 1943 |